(12) United States Patent
Sladecek

(10) Patent No.: US 9,161,662 B2
(45) Date of Patent: Oct. 20, 2015

(54) FOOD PROCESSOR COMPRISING A WEIGHING DEVICE

(75) Inventor: Marcel Sladecek, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 265 days.

(21) Appl. No.: 13/515,144

(22) PCT Filed: Dec. 20, 2010

(86) PCT No.: PCT/IB2010/055951
§ 371 (c)(1),
(2), (4) Date: Jun. 11, 2012

(87) PCT Pub. No.: WO2011/080660
PCT Pub. Date: Jul. 7, 2011

(65) Prior Publication Data
US 2012/0286080 A1 Nov. 15, 2012

(30) Foreign Application Priority Data
Dec. 28, 2009 (EP) .................................... 09180780

(51) Int. Cl.
*A47J 43/046* (2006.01)
*A47J 27/00* (2006.01)

(52) U.S. Cl.
CPC .............. *A47J 43/046* (2013.01); *A47J 27/004* (2013.01)

(58) Field of Classification Search
CPC ..... A47J 43/0716; A47J 44/00; A47J 43/046; A47J 27/004
USPC ............................ 241/65, 101.2, 282.1, 282.2
See application file for complete search history.

(56) References Cited

U.S. PATENT DOCUMENTS 7,022,920 B2    4/2006   Hulburt et al.

FOREIGN PATENT DOCUMENTS

| DE | 102008027353 A1 | 12/2009 |
| EP | 0173068 B1 | 3/1986 |
| EP | 0959982 B1 | 12/1999 |
| EP | 1123678 | 8/2001 |
| EP | 1123678 A2 | 8/2001 |
| EP | 1439379 A1 | 7/2004 |
| GB | 533634 A | 2/1941 |
| GB | 2239098 A | 6/1991 |
| GB | 2436876 A * | 10/2007 |
| WO | 2009049893 A1 | 4/2009 |

* cited by examiner

*Primary Examiner* — Mark Rosenbaum

(57) ABSTRACT

A food processor device for processing foodstuff includes a housing and a food processing container for holding foodstuff during processing. The food processing container is supported by the housing during use of the food processor device. The food processor further includes a user interface for exchanging information, during use, with the user and a food weighing device. The food weighing device includes a food weighing bowl for weighing foodstuff before the foodstuff is entered into the food processing container, and at least one weighing sensor for sensing the weight of the food weighing bowl. During weighing, the food weighing bowl is located above the food processing container. Further, the weighing bowl is suitable for covering the food processing container during food preparation.

20 Claims, 4 Drawing Sheets

FOOD PROCESSOR COMPRISING A WEIGHING DEVICE

FIELD OF THE INVENTION

The invention relates to a food processor for processing foodstuff comprising a housing, a food processing container for holding foodstuff during processing, during use supported by said housing, a user interface for exchanging information, during use, with the user, and food weighing means comprising a food weighing bowl for weighing foodstuff before said foodstuff is being entered into the food processing container, and at least one weighing sensor for sensing the weight of the food weighing bowl.

BACKGROUND OF THE INVENTION

European patent EP 1123678 B1 discloses a kitchen machine having a mixing vessel, a drive for an agitator in the mixing vessel and a weighing device. The weighing device of the kitchen machine of EP 1123678 B1 is integrated in each of the feet of said kitchen machine. The requirement of having a weighing device in each foot restrains the design freedom for designing the kitchen machine. Furthermore, the weighing device of the kitchen machine of EP 1123678 B1 necessarily weighs the entire machine. As the weight of the foodstuffs to be weighed can be far less than the gross weight of the kitchen machine, imprecise weighing results might be obtained. From a user perspective a major drawback of the kitchen machine of EP 1123678 B1 is that an ingredient is weighted while being added to the mixing vessel. In this mixing vessel already other foodstuffs can be present. In such a case the user has to take great care not to add too much of the ingredient as it is difficult if not impossible to retrieve an excess of ingredient being added. This is especially true when liquid ingredients are being added, but can also be the case when solid ingredients are being added, for instance when color and substance of the ingredient matches with the foodstuff already present in the mixing vessel. This is not user friendly.

SUMMARY OF THE INVENTION

It is an object of the invention to provide a more user friendly food processor comprising a weighing device.

The object of the invention is realized by the food processor as defined in claim 1. Particularly, the food processor according to the invention has a food weighing bowl which is, during weighing, located above the food processing container.

A user requiring adding a specific amount of foodstuff to the food processing container of the food processor places the weighing bowl on its position above the food processing container. At the time the weighing bowl is placed above the food processing container, the weighing bowl can be empty, that is not containing any foodstuff, or can contain foodstuff already. The weight of the weighing bowl and the foodstuff which might already be placed onto the weighing bowl can be displayed on e.g. a user interface of the food processor or the weighing means.

In a practical embodiment, the user interface allows the user to select a net weight option which subtracts the weight of the weighing bowl from the displayed weight.

For example, the user might place the empty weighing bowl above the food processing container and select the option of deducting the weight of the weighing bowl. This would result in a zero weight readout on the user interface. Next, the user starts to add a first foodstuff to the weighing bowl. As a result, the user interface weight readout will show the increasing weight of the foodstuff being added to the weighing bowl. The user will keep adding the first foodstuff to the weighing bowl until he or she has added the desired weight. In case of an overshoot, that is when the user added more of the first foodstuff to the weighing bowl than he or she desired, the user can easily remove the excess from the weighing bowl. When the user is satisfied with the amount of the first foodstuff on the weighing bowl, he or she can empty the weighing bowl into the food processing container and start a new weighing session, e.g. for a second foodstuff. Again, the user keeps adding the second foodstuff to the weighing bowl until the desired amount is in the weighing bowl. When the user accidently puts too much of the second ingredient into the weighing bowl, he or she can again easily remove the excess as the bowl only contains the second foodstuff. The second foodstuff cannot mix with the first foodstuff until the user empties the weighing bowl containing the second foodstuff in the food processing container. The option of easily correcting adding an excess amount of foodstuff to the weighing bowl is very user friendly. When the user finished adding foodstuff to the food processing container he or she can start the food processing process.

When required, the user can place the weighing bowl above the food processing container during food processing to weigh additional ingredients, so-called intermediate ingredients, for adding to the food processing container. The food processing can be continued or paused during the weighing of an intermediate ingredient. The weighing of intermediate ingredients takes place in a manner similar to that described above.

In another practical embodiment the user interface allows the user to reset the net weight to start a new weighing session at zero weight without emptying the weighing bowl. In such an embodiment the user does not have to empty the weighing bowl after weighing each foodstuff. This is user friendly as it saves the user effort.

In a preferred embodiment of the food processor according to the invention, the at least one weighing sensor is comprised in a top rim of the food processing container. The top rim of the food processing container is an advantageous location for the at least one weighing sensor as each food processing container has a top rim which is on the top side of the food processing container. It is intuitive for the user to place the weighing bowl on top of the food processing container to start weighing. As this placement is intuitive, it is also user friendly.

In a preferred embodiment of the food processor according to the invention, the at least one weighing sensor is comprised in a top rim of the housing. In configurations where the food processor has a housing surrounding such a part of the periphery of the food processing container that the housing can be used to support the weighing scale during use, it is advantageous to locate the at least one weighing sensor in the top rim of the housing. This eases establishing the connection between the at least one weighing sensor and the user interface of the food processor, making the food processor less complex to design and manufacture and therefore cheaper.

In a preferred embodiment of the food processor according to the invention, a weighing bowl support structure is arranged for supporting the weighing bowl during weighing, and said weighing support structure is further arranged to transfer the weight of the weighing bowl to the at least one weighing sensor. Such an embodiment is especially advantageous as it gives the designer full control over the location of the weighing sensors. Further, the weighing support structure can be designed such that a solid support of the weighing bowl is realized allowing the user to be less careful when placing the weighing bowl above the food processing container to start weighing. Even further, the weighing support structure can be arranged to allow a wide variety of bowls and even other types of utensils such as a plate, cup, box or the like to be used. It should be noted that such a wide variety of bowls and other types of utensils can be used with any other embodiment of the invention as well, provided that the elements supporting the means for holding the foodstuff during weighing are adapted to do so.

In a preferred embodiment of the food processor according to the invention, the at least one weighing sensor is located on a bottom side of the weighing bowl.

In a practical embodiment the at least one weighing sensor can communicate wirelessly with the food processor user interface, e.g. through Near Field Communication, Blue tooth, Zigbee or any other kind of suitable technology. Within the range of the wireless communication between the food processor user interface and the at least one weighing sensor, the weighing scale can be used to weigh items, not necessarily foodstuff, when not placed above the food processing container. This improves usability of the weighing bowl and therefore its user friendliness.

In a preferred embodiment of the food processor according to the invention, the weighing bowl is removably attached to the food processor. This is advantageous as a removable weighing bowl can be removed from the food processor and e.g. loaded on a location different from where the food processor is operated, e.g. the weighing bowl might be loaded in a storage room while the food processor is located in the kitchen. Further, the weighing bowl might be removed to allow a better view on the food being processed or for the placement of a cover over the food processing container to prevent foodstuff from leaving the food processing container during food processing. Even further, it facilitates easy cleaning of the weighing bowl if it can be removed from the food processor and be cleaned separately, e.g. by using a dish washer which cannot be used to clean the food processor as a whole.

In a preferred embodiment of the food processor according to the invention, the weighing device comprises three weighing sensors. The weighing bowl has to be placed on the weighing sensors for weighing. It is user friendly to provide a multitude of weighing sensors as this makes it easier for the user to place the weighing bowl correctly onto the weighing sensors. Placing the weighing bowl correctly means in this context placing the weighing bowl on the weighing sensors only, thus in a manner that the weighing bowl is not entirely or partially supported by other elements than the weighing sensors as this can lead to imprecise or incorrect measurements. On the other hand, due to the costs of weighing sensors, it is desirable to have as less weighing sensors as possible. A good compromise between ease of use and control of total weighing sensor cost is found by applying three weighing sensors.

In a practical embodiment wherein the food processor comprises at least two weighing sensors, the weighing sensors being distributed evenly to support the weighing bowl during weighing. Preferably, the at least two weighing sensors are placed on an imaginary circle each being separated 360/n degrees wherein n is the number of weighing sensors.

In a preferred embodiment of the food processor according to the invention, the weighing bowl is suitable for covering the food processing container during food preparation. In general, to prevent foodstuff from leaving the food processing container during food processing, and thereby e.g. messing the food processor's environment, a cover is placed over the food processing container. By using the weighing bowl as food processing container cover, the weighing bowl has multiple functions and no separate weighing bowl and food processing container cover are to be provided with the food processor of the invention. This is very user friendly as no extra storage space is required. Further, as the number of parts of the food processor is reduced, fewer parts can get lost. This is also user friendly.

In a preferred embodiment of the food processor according to the invention, the weighing bowl comprises a fall-through mechanism to allow the foodstuff to fall into the food processing container after weighing. Due to the fall-through mechanism the user does not have to take the weighing bowl from its weighing position to empty it into the food processing container. Instead, the user can use the fall through mechanism to open the weighing bowl and empty it into the food processing container. As the fall-through mechanism saves the user effort, this embodiment is user friendly.

In a practical embodiment of the food processor according to the invention, the fall through mechanism comprises a moveable element which is moveable between a closed position for weighing the foodstuff and an open position for allowing the foodstuff to fall into the food processing container. This is a very straightforward and easy to manufacture way of realizing a fall-through mechanism allowing a cost-efficient way of designing and manufacturing the food processor of the invention.

In a practical embodiment of the food processor according to the invention, the fall through mechanism comprises a central aperture, the central aperture being adjustable between a closed position for weighing the foodstuff and an open position for allowing the foodstuff to fall into the food processing container. A user placing foodstuff on the weighing bowl for weighing typically places the foodstuff more or less in the central area of the weighing bowl. Having a weighing bowl with a fall through mechanism which opens from the centre of the weighing bowl is beneficial as the foodstuff will fall through even before the aperture is fully open. As the aperture is only opened partially in such cases, the user effort is minimized and user friendliness improved.

In a practical embodiment of the food processor according to the invention, the fall through mechanism comprises two parts which can rotate with respect to each other between a closed position for weighing the foodstuff and an open position for allowing the foodstuff to fall into the food processing container. This is a very easy way of implementing a fall through mechanism, allowing relative cheap production of the fall through mechanism. Further, this mechanism is intuitive for the user, making the food processor of the invention more user friendly.

In a practical embodiment of the food processor according to the invention, the weighing bowl comprises two substantially parallel plates forming the bowl bottom, each of said two plates covering a section of the bowl bottom, said two plates being rotatable with respect to each other around an axis of rotation substantially located in the centre of the weighing bowl, said axis of rotation being perpendicular to the plates, wherein the two plates are rotatable into a closed position wherein the plates cover the entire bowl bottom preventing foodstuff to fall through, for weighing the foodstuff, and an open position in which a section of the bowl bottom is not covered by the plates, for allowing the foodstuff to fall into the food processing container. A fall-through mechanism of this kind is very intuitive and easy to understand and use. Thereby making the food processor more user friendly.

In a preferred embodiment of the food processor according to the invention, the food processor comprises heating means for heating the foodstuff during preparation. Heating means further increase the use possibilities of the food processor, allowing the user to perform more food preparation activities with the same device. In some embodiments of a food processor having heating means, the user might even be capable of preparing an entire meal with only one device. Such an omnifarious device is very user friendly.

In a preferred embodiment of the food processor according to the invention, the weighing bowl comprises two substantially parallel plates having a plurality of holes, said plates forming the bowl bottom, said two plates being rotatable with respect to each other around an axis of rotation substantially located in the centre of the weighing bowl, said axis of rotation being perpendicular to the plates, wherein the two plates are rotatable into a closed position wherein the holes of the first plate are covered by the second plate and an open position wherein the holes of the first plate and the holes of the second plate are coaxial. A weighing bowl of this type can, in its closed position, be used as a weighing bowl. However, in its open position it can also be used to steam foodstuff being place on top of it. The user operating the food processor of the invention to steam food first fills the food processing container with water and switches on the heating means. Second, the user places the weighing bowl in the open position on the rim and adds the foodstuff to be steamed to the weighing bowl. The heating means cause the water to boil, starting the steam generation. The steam will move through the holes and reach the foodstuff. The foodstuff will be steamed. Many users perceive steaming as a healthy food preparation method. Being able to steam food with a food processor expands the usage options of the device even further, leading to a more user friendly device. Further a weighing bowl as described above could be used as a sieve, either when mounted on the food processor in the weighing position or, in case of a removable weighing bowl, when taken from the food processor to e.g. the sink. Such a further usage option makes the food processor according to the invention even more user friendly.

With reference to the claims it is noted that the invention also relates to all possible combinations of features and/or measures defined in the various claims.

It is to be noted that European Patent EP 1731068 B1 discloses a food-cooking mixer for processing and preparing food. This food-cooking mixer comprises a base structure having a support sustained on weighing means. The food is mixed and cooked in a container sustained by the base structure. The device according to EP 1731068 B1 weighs the weight of the food being entered into the container. In case that there are already other ingredients in the container, the user will find it difficult if not impossible to retrieve an excess of a specific ingredient once it is in the same container as other ingredients.

It is to be further noted that European Patent EP 0959982 B1 discloses a gravimetric blender having a weigh bin connected to a frame and a mix chamber below the weigh bin. The frame comprises means for sensing the weight of the material in the bin. The gravimetric blender disclosed by EP 0959982 B1 is intended to be used in conjunction with a material storage hopper in an industrial environment, e.g. in the production of plastic resins. The device of EP 0959982 B1 also comprises a mechanism for opening and closing the weigh bin when a preset amount of material is fed to the bin. The gravimetric blender is intended to be placed right above further processing machinery for molding or extruding plastics. This type of configuration is highly unpractical for preparing food in an end-user environment as the home kitchen.

BRIEF DESCRIPTION OF THE DRAWINGS

A detailed description of the invention is provided below. The description is provided by way of a non-limiting example to be read with reference to the drawings in which:

FIG. 7b presents a side view of the food weighing bowl according to FIG. 7a.

FIG. 7c presents a further side view of the food weighing bowl according to FIG. 7a.

DETAILED DESCRIPTION OF THE EMBODIMENTS

In figures showing the same embodiment or the same parts thereof, the same numbers are used for the same parts. Further, parts having a similar function in different embodiments are referenced by the same numbers as well.

Figure 1:
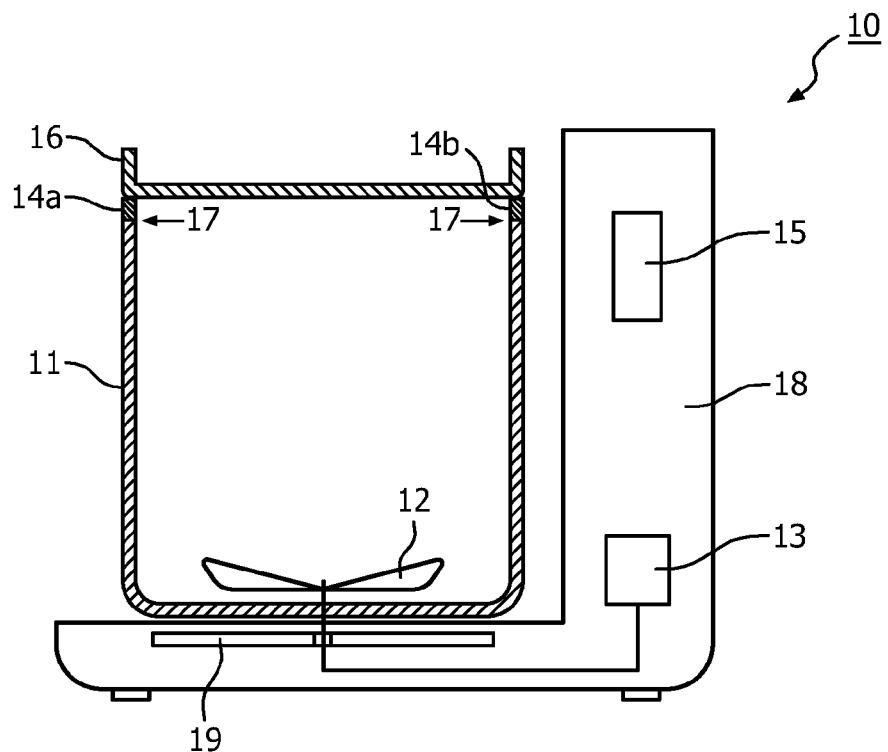
FIG. 1 presents schematically an exemplifying food processor in accordance with a first embodiment of the present invention.

FIG. 1 presents an exemplifying food processor 10 in accordance with a first embodiment of the present invention. The food processor 10 comprises a housing 18 and a food processing container 11. The food processing container 11 can be of any shape. However, due to reasons of fluid dynamics, food processing containers having a smooth inner surface are preferred. In this embodiment a cylindrical food processing container is used. The food processing container 11 has a top rim 17. This top rim 17 comprises weighing sensors 14a and 14b. FIG. 1 shows two weighing sensors, however, other configurations having more than two or only one weighing sensor are also possible in other embodiments. The food processor 10 further comprises a weighing bowl 16 for weighing food stuff before being entered into the food processing container 11. During use, this weighing bowl 16 rests on the weighing sensors 14a and 14b.

A food processing tool 12 is present in the food processing container 11. The food processing tool 12 can be of any known type and is not part of the invention presented. The food processing tool 12 might be removably connected to the food processing container 11. Such connections are known from the art, e.g. from PCT application IB2009/052119, and are not part of the invention disclosed. The food processing tool 12 is driven by a driving means 13, e.g. an electrical motor. However, other driving means are feasible as well.

Below the food processing container 11 a heating means 19 is present, located in the housing 18. Heating means 19 is arranged to heat the food processing container 11, and more specifically the food present in this food processing container 11, during use of the food processor. It should be noted that in other embodiments of the food processor according to the invention, no heating means might be present. From the state of the art many different heating means are known, see e.g. EP 09176159.3, and not detailed further here. The housing 18 further contains a user interface 15 for exchanging information between the user and the food processor.

A user requiring to process food articles, e.g. by using a food processor 10, often requires a certain amount of foodstuff to be processed. Such amount can be by the piece, e.g. one or more eggs, onions, apples or the like. Usually, such pieces of foodstuff only need to be counted before being added to the food processing container 11. Other food articles are of a more continuous nature and need to be weighed before being added to the food processing container in order to have the correct amount of such foodstuff. Examples of such foodstuff being of a more continuous nature are liquids, butter, sugar et cetera. It is evident for a person skilled in the preparation of food which foodstuffs need to be weighed before being added to a food processing container and which only need to be counted, e.g. on reading the ingredient list of a recipe he wants to prepare. However, it should be noted that depending on the recipe, ingredients of a more continuous nature might not require weighing as in the directions of a recipe other methods of measuring the required amount might be specified, such as the number of spoons of a certain foodstuff to be added. This invention allows the user to weigh foodstuff of a more continuous nature and add a weighed amount to the food processing container in a very user friendly way. Also, foodstuffs which go by the piece might have to be weighed before being added to the food processing container 11. For example this can be desirable when a recipe indicates the use of a certain weight of foodstuff going by the piece, like 350 grams of carrots.

As the device of the invention combines a food processor and a weighing device, the user only requires one device, which is very user friendly as this saves space on the kitchen table top while using the device and in the kitchen closet when storing the device. Further, as only one device is used, the amount of cleaning needed afterwards is reduced. Another advantage of having an integrated weighing device and a food processor is that the user always has a weighing scale at hand when using the food processor, that is when preparing food, and does not have to search for a scale.

When using the food processor 10 to prepare food, the user first has to add the ingredients to the food processing container 11. Foodstuff that goes by the piece or other discrete measure like spoon or handful can be added without weighing. However, other foodstuffs will require weighing. To weigh these foodstuffs the user places the food weighing bowl 16 on top of the food processing container 11. By doing so, the food weighing bowl 16 rests upon the weighing sensors 14a and 14b which are comprised in the food processing container 11 top rim 17. Weighing sensors as such are known and not part of this invention. The weighing sensors 14a and 14b are connected to a user interface 15 of the food processor 10. This connection can be made by a wired conducting path between the weighing sensors 14a and 14b and the user interface 15 running inside the food processing container 11 wall interfacing at the area in which the food processor container 11 rests on the base of the food processor 10 and further through the food processor interior, or via a wireless connection such as Zigbee or NFC. Other ways of connecting the weighing sensors 14a and 14b and the user interface 15 are possible as well. As the connection between the weighing sensors 14a and 14b and the user interface 15 as such is not part of this invention, it is not detailed in FIG. 1. In this embodiment, the user interface 15 includes processing means (not shown) capable of interpreting the signal received from the weighing sensors 14a and 14b and outputting a signal to inform the user on the current weight. In other embodiments the processing means can be a separate component of the food processor 10.

It is well known for weighing scales to have a so-called 'zero-function' allowing the user the set the output of the measured weight to zero on the user interface 15, for example after placing the weighing bowl 16. This allows the user to very conveniently set the outputted weight to zero when commencing a weighing session. This is very user friendly. This function is however not necessary to be present in food processors according to the invention as this specific function does not contribute to solving the main problem of the prior art, being that the user has to take great care not to add too much of the ingredient to the food processing container 11 already containing other foodstuffs as it is difficult if not impossible to retrieve an excess of ingredient being added.

As foodstuff is placed on the weighing bowl 16, the weight of this foodstuff will be outputted to the user via the user interface 15. When the user is satisfied with the weight of the foodstuff on the weighing bowl 16, the user can empty the weighing bowl 16 into the food processing container 11 and weigh another foodstuff is desired. In an alternative use-scenario the 'zero-function' discussed before can be used to reset the output of the user interface 15 and continue weighing foodstuffs on the weighing bowl 16 without emptying the weighing bowl 16 into the food processing container 11. This is however not the advised way of using the food processor according to the invention as this might put the user in the situation that the user wants to retrieve an excess of a certain foodstuff from the weighing bowl 16 while this foodstuff is already inseparable from other foodstuff already present on the weighing bowl 16.

After the required foodstuffs have been added to the food processing container 11, the user can start the driving means 13, e.g. through the user interface 15. After the driving means 13 is activated, the food processing tool 12 will start operating as the food processing tool is drivingly connected to the driving means 13. The food processing tool 12 operates on the foodstuff in the food processing container 11 in manners generally known by the person skilled in the art of food processing.

In the preparation of some recipes is desirable to heat the foodstuffs during processing. To enable the user to make these recipes using an embodiment of the food processor of the invention, a heating element 19 is in part of food processor 10. The user can control the heating element 19 via the user interface 15 in a way known in the art. In some embodiments of the food processor according to the invention a user-programmable user interface 15 can be implemented allowing the user to instruct the food processor 10 to activate the food processing tool 12 and the heating element 19 in such a manner that they cooperate in preparing a recipe. This means that the food processing tool 12 and the heating element 19 are activated in relation with each other. E.g. first the food processing tool 12 is activated to chop or mix the foodstuffs in the food processing container 11. Following this chopping the heating means 19 is activated to e.g. boil or simmer the foodstuffs. While the heating means 19 is active, the food processing tool 12 might be activated every now and then to promote good mixing of the foodstuff and to prevent burning or scorching of the foodstuff.

Figure 2:
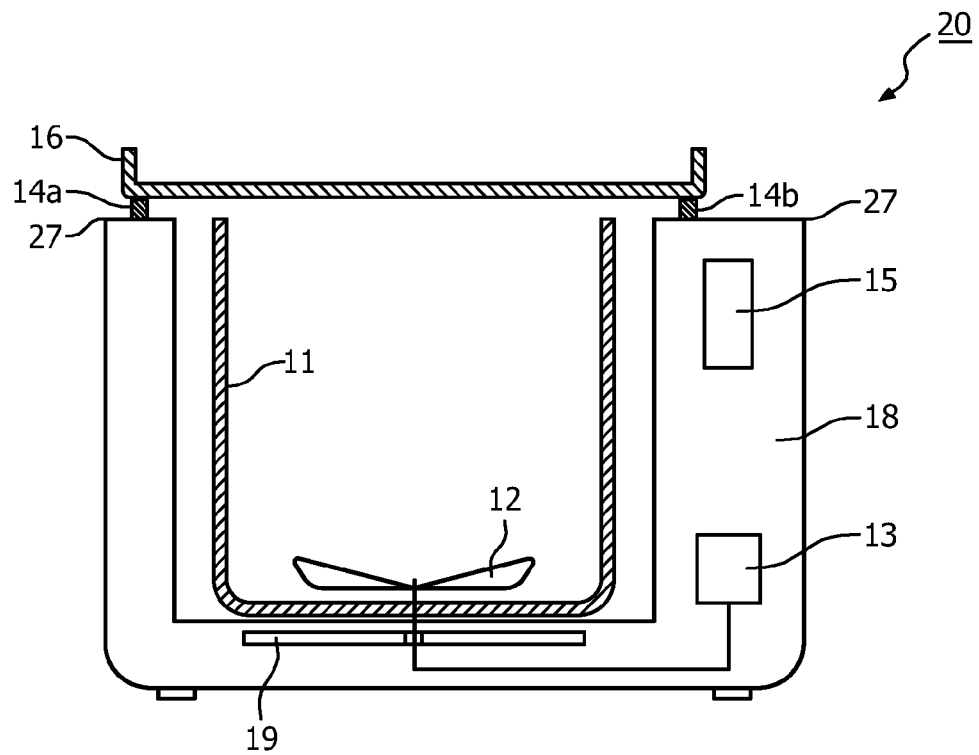
FIG. 2 presents schematically an exemplifying food processor in accordance with a second embodiment of the present invention.

In FIG. 2 a further exemplifying embodiment of a food processor 20 in accordance with a second embodiment of the present invention is shown in a schematical manner. To prevent an unnecessary long description of this embodiment only the differences with the food processor 10 as discussed above will be mentioned. The housing 18 of the food processor 20 surrounds at least partially a food processing container 11. This means that the food processor housing 18 either fully or partially surrounds the food processing container 11. However, in this embodiment the housing is present at at least two different sections of the perimeter of the food processing container 11. The housing 18 has a top rim 27 on which the at least one weighing sensor is placed. In some embodiments the at least one weighing sensor can be integrated with the top rim 27 or be attached to this top rim 27. In the embodiment of FIG. 2, two weighing sensors 14a and 14b are present. In other embodiments another number of weighing sensors can be applied. During use, the weighing bowl 16 rest on the weighing sensors 14a and 14b. The operation of the food processor 20 is similar to the operation of food processor 10 and not detailed further.

Figure 3:
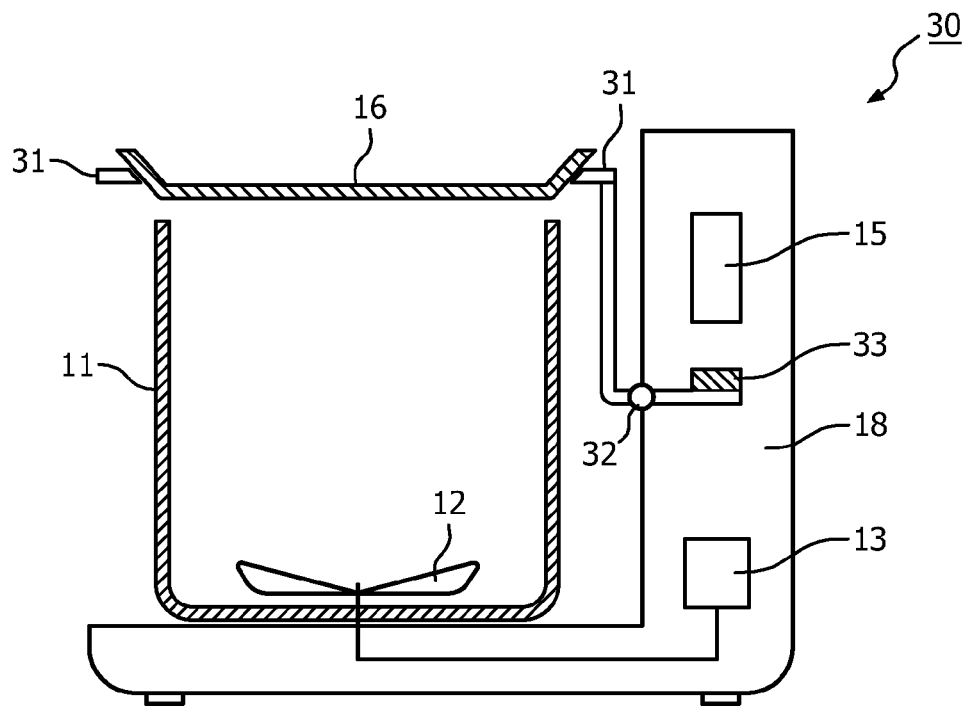
FIG. 3 presents schematically an exemplifying food processor in accordance with a third embodiment of the present invention.

In FIG. 3, a further exemplifying embodiment of a food processor in accordance with the present invention is shown in a schematical manner. Again, only differences with the previously discussed embodiments are described. Food processor 30 has a support structure 31 arranged to support the weighing bowl 16 during operation. The support structure 31 is hingingly connected to food processor housing 18 via hinge 32. Hinge 32 might as well be a pivot point. The support structure 32 extends for a certain extend into the interior of the food processor housing 18. In a practical embodiment the angle over which the support structure 31 can rotate around hinge 32 will be restricted to a range suitable for operation. Inside the food processor housing 18 a weighing sensor 33 is positioned such that it is in contact with the part of the support structure 31 in a manner that the support structure 31 exerts a pressure to the weighing sensor 33 depending on the load put on the support structure 31. Consequently, the weighing sensor 33 is placed above the part of the support structure 31 which extends into the food processor housing. In alternative embodiments, the weighing sensor 33 might be integrated with the hinge 32, allowing for simpler construction.

During operation the food weighing bowl 16 is placed on the support structure 31. The geometry of the support structure 31 is in correspondence with the geometry of the food weighing bowl 16. E.g. a circular food weighing bowl 16 is supported by an annular formed support structure 31. It is advantageous to have a support structure 31 with a central opening as this will allow the user to add foodstuff to the food processing container 11 without hindrance from the support structure 31. When foodstuff is added to the food weighing bowl 16 while this food weighing bowl 16 is placed on the support structure 31, the force exerted on the weighing sensor 33 increases accordingly as will be readily understood by the person skilled in the art based on textbook physics.

It should be noted that the food processor 30 does not comprise a heating means 19 for heating foodstuff inside the food processing container 11. Thus, the food processor 30 has limited capabilities in comparison to the embodiments shown in FIGS. 1 and 2. However, the person skilled in the art will appreciate that the objectives of the invention as presented are realized in both food processors with and without heating means.

Figure 4:
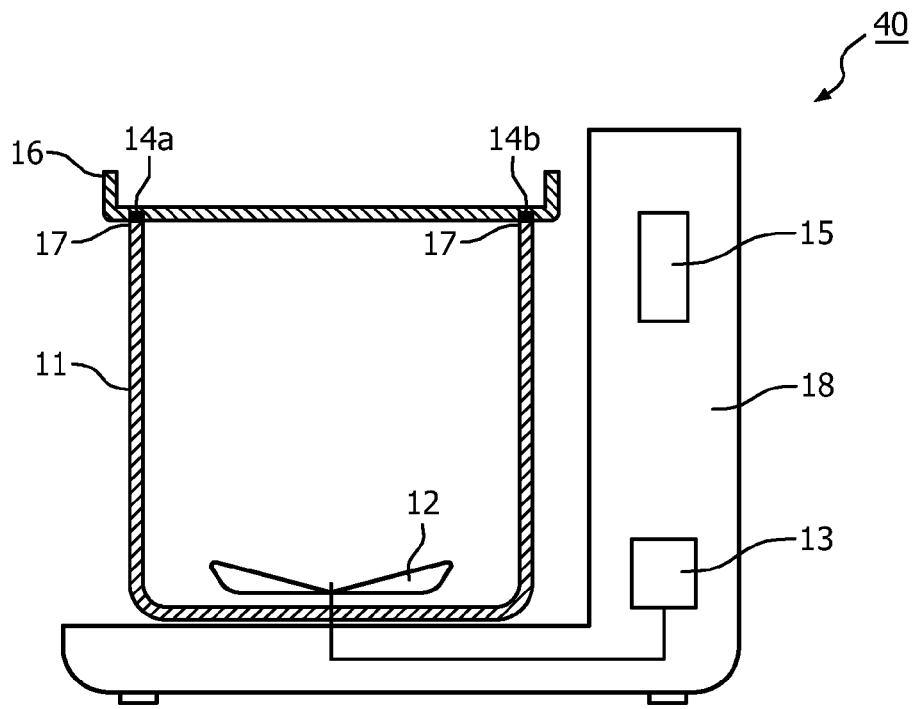
FIG. 4 presents schematically an exemplifying food processor in accordance with a fourth embodiment of the present invention.

In FIG. 4, a further exemplifying embodiment of a food processor in accordance with the present invention is shown in a schematical manner. Again, only differences with the previously discussed embodiments are described. A food processor 40 has a food weighing bowl 16. Weighing sensors 14a and 14b are integrated with the weighing bowl 16. In this embodiment the weighing sensors 14a and 14b are located in the interface are between the food processing container 11 and the food weighing bowl 16. That is, during use of the food weighing bowl 16, the food weighing bowl 16 rests on the top rim 17 of the food processing container 11 via the weighing sensors 14a and 14b. In this embodiment, the weighing sensors 14a and 14b preferably communicate with the user interface 15 in a wireless way. In an alternative embodiment of the food processor 40, the food weighing bowl 16 rest on the top rim of the housing of the food processor.

Figure 5:
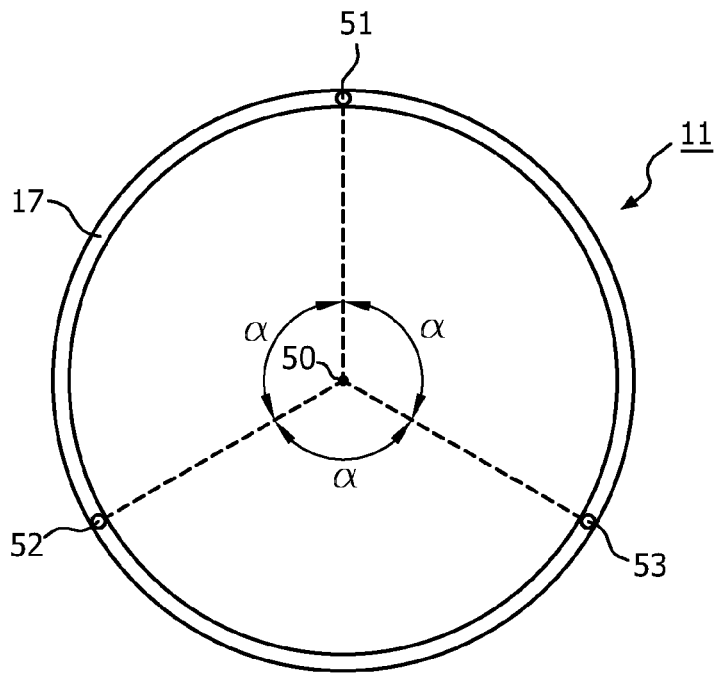
FIG. 5 illustrates schematically an exemplifying spatial distribution of the weighing sensors along a top rim of a food processing container.

Although the exemplifying embodiments of FIGS. 1, 2 and 4 suggest the usage of two weighing sensors, it should be noted that the invention is not restricted to food processors having two weighing sensors only. As a matter of fact, as is well known from basic physics to the person skilled in the art, a stable placement of a body can be reached by using three supports. Accordingly, it can be preferred to use three weighing sensors. However, it is stressed that any number of weighing sensors can be used to reach the objectives of the invention. In embodiments similar to those in FIGS. 1, 2 and 4, it is preferred to distribute the weighing sensors evenly over the contact surface between the weighing bowl and the top rim of the food processing container (like in the embodiments of FIGS. 1 and 4) or the top rim of the food processor housing (like in the embodiment of FIG. 2). This is illustrated in FIG. 5 which schematically shows a top rim 17 of a food processing container 11 of a food processor similar to the embodiment shown in FIG. 1, which is a food processor wherein weighing sensors are integrated or attached to a top rim of the food processing container. In this embodiment, three weighing sensors 51, 52 and 53 are provided on the top rim 17 of the substantially circular food processing container 11. The distance between adjoining sensors is equal when measured along the top rim 17. More generally, when constructing lines between a virtual central axis 50 of a food processing container and the weighing sensors, the angles between these lines for adjoining sensors is 360/n degrees. In the embodiment shown in FIG. 5 this results in an angle α of 360/3=120 degrees. When, for example, five weighing sensors are chosen to be applied this angle will be 360/5 =72 degrees.

Figure 6A:
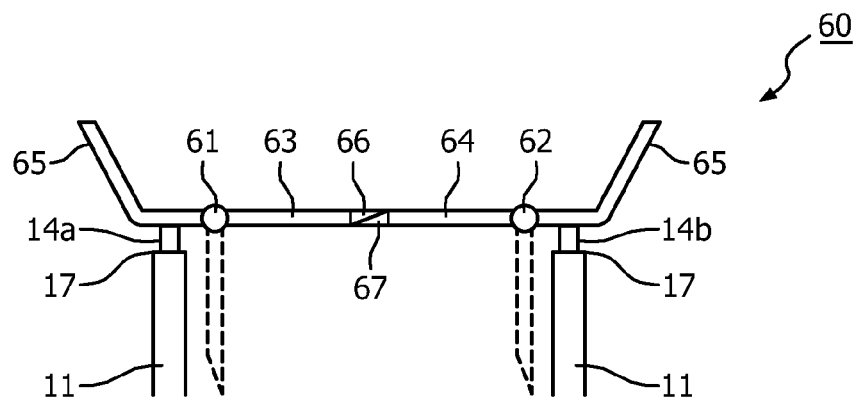
FIG. 6a presents schematically an exemplifying food weighing bowl having a fall through mechanism for application in a food processor of the present invention.
Figure 6B:
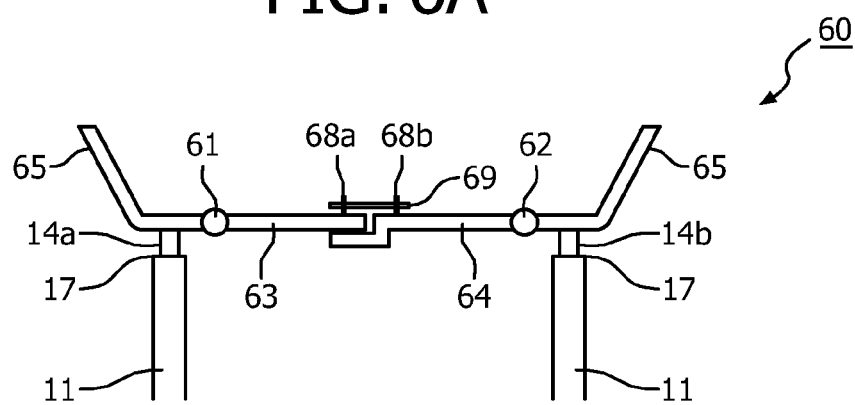
FIG. 6b presents schematically a further exemplifying food weighing bowl having a fall through mechanism for application in a food processor of the present invention.

In FIG. 6a an exemplifying food weighing bowl having a fall through mechanism for application in a food processor of the present invention is shown in a schematical manner. A food weighing bowl 60 having a fall through mechanism is presented for application with a food processor similar to one of the embodiment of FIG. 1. However, it should be noted that the objective of FIGS. 6a and 6b is to illustrate the fall through mechanism and that the person skilled in the art will recognize that a food weighing bowl having a fall through mechanism can be applied to any embodiment of the invention. In FIGS 6a and 6b, the top rim 17 of a food processing container 11 is shown. During use, the food weighing bowl 60 rest upon weighing sensors 14a and 14b. The weighing bowl 60 consists of an annular side part 65 and two central parts 63 and 64 which can hinge around hinges 61 and 62 respectively. The central parts can be placed in a closed position, indicated in FIG. 6a by solid lines, and in an opened position, indicated in FIG. 6a by dashed lines. To use the weighing bowl 60, the user places the food weighing bowl 60 on the top rim 17 of the food processing container 11 and places the central parts 63 and 64 in the closed position. After adding a desired amount of foodstuff to food weighing bowl 60 the user disconnects the two central parts 63 and 64 after which these central parts 63 and 64 move to their open position under the influence of gravity and the foodstuff falls into the food processing container 11. A user desiring to continue weighing foodstuffs to be added to the food processing container 11 brings the central parts 63 and 64 to their closed position and continues weighing.

The central parts 63 and 64 can, for example, be held in their closed position with the use of an electromagnet 66 being placed in one of the central parts 63 or 64 and a ferromagnetic part 67 in the other. When the power to the electromagnet 66 is interrupted, the magnetic force generated by electromagnet 66 disappears and the central parts 63 and 64 move to their open position under the influence of gravity. The user can interrupt the power to the electromagnet 66 by e.g. pressing a button (not shown) on the food weighing bowl 60. Other mechanisms to fixate the two central parts 63 and 64 in their closed position are feasible as well. E.g. in FIG. 6b a fixating mechanism comprising two rings 68a and 68b attached to the upside of the central parts 63 and 64 respectively is shown. The rings 68a and 68b are attached to the upside of the central parts 63 and 64 in such a manner that they are opposite to each other and allow a pin 69 to be inserted through both rings 68a and 68b. The user can utilize the rings 68a and 68b to position the central parts 63 and 64 in their closed position. After insertion of the pin 69 both central parts 63 and 64 cannot move to the open position. However, on removal of the pin 69 from the rings 68a and 68b the central parts 63 and 64 will move to their open position under the influence of gravity.

Figure 7A:
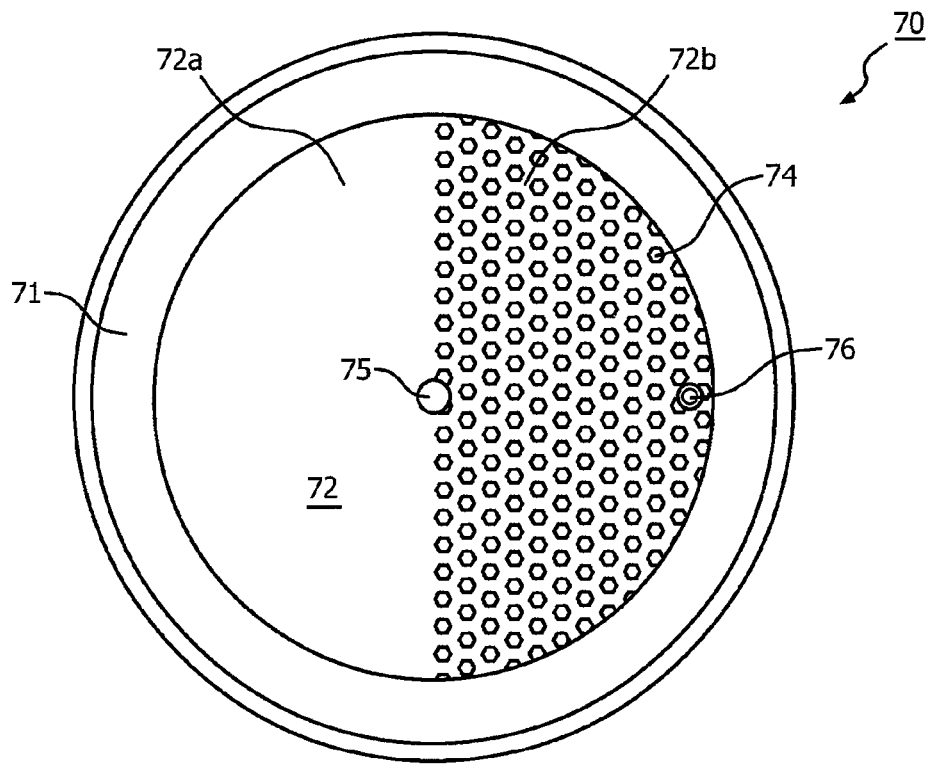
FIG. 7a presents schematically an exemplifying food weighing bowl having a steaming functionality for application in a food processor of the present invention according to a top view.

By using a specially adapted food weighing bowl 70 embodiments of the food processor of the invention having a heating element, such as the embodiments presented in FIGS. 1 and 2, can be used as a steaming device as well. Such a food weighing bowl is presented in FIGS. 7a, 7b and 7c. Food weighing bowl 70 comprises an annular side part 71 and two central parts 72 and 73. Both central parts 72 and 73 have a closed part 7a and 73a respectively and a perforated part 72b and 73b respectively having perforations 74. Central parts 72 and 73 are placed substantially parallel to each other in a plane perpendicular to a longitudinal axis of the food processing container (not shown) when the food weighing bowl 70 is placed on top of said food processing container. The two central parts 72 and 73 are rotatable with respect to each other in a direction substantially perpendicular to the aforementioned longitudinal axis around a rotational axis 75. To facilitate the user in rotating the central parts 72 and 73 with respect to each other a rotation knob 76 is provided, in this embodiment attached to central part 72. Using the rotation knob 76 the user can adjust the position of the two central parts with respect to each other between a weighing position illustrated in FIG. 7b and a steaming position illustrated in FIG. 7c.

Figure 7B:
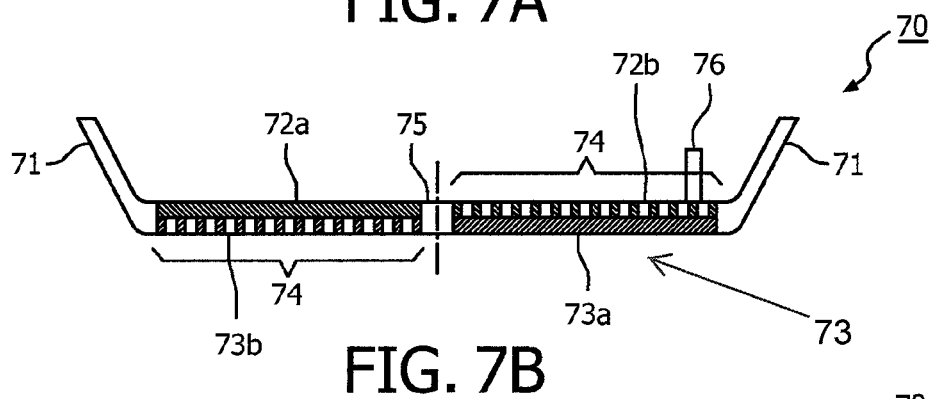
Figure 7C:
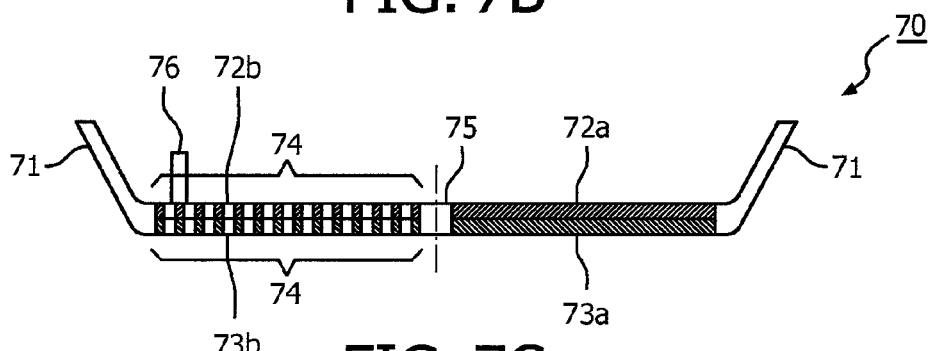

In the weighing position illustrated in FIG. 7b, the closed part of the first of the central parts overlaps the perforations in the perforated part of the further central part. In this configuration foodstuff placed upon food weighing bowl 70 cannot pass the food weighing bowl and thus can be weighed. In this position, the food weighing bowl 70 can be used as described above.

A user desiring to use the food processor 10, 20 for the steaming of food first fills the food processing container 11 with water and turns on the heating element 19. Consequently, the water in the food processing container 11 will heat up and, after some time, will start to boil thereby producing steam. When food weighing bowl 70 is placed above the food processing container 11 in the steaming position illustrated in FIG. 7c steam will flow through the perforations 74. Food placed on top of these perforations will be brought in contact with the steam and thus be steamed.

While the invention has been illustrated and described in detail in the drawings and in the foregoing description, the illustrations and the description are to be considered illustrative or exemplary and not restrictive. The invention is not limited to the disclosed embodiments. It is noted that the food processor according to the invention and all its components can be made by applying processes and materials known per se. In the set of claims and the description the word "comprising" does not exclude other elements and the indefinite article "a" or "an" does not exclude a plurality. Any reference signs in the claims should not be construed as limiting the scope. It is further noted that all possible combinations of features as defined in the set of claims are part of the invention.

The invention claimed is:

1. A device for processing foodstuff comprising:
    housing;
    a food processing container for holding foodstuff during processing, wherein during use the food processing container is supported by said housing;
    a user interface for exchanging information, during use, between a user and the device;
    a food weighing bowl for weighing foodstuff before said foodstuff is being entered into the food processing container; and
    at least one weighing sensor for sensing the weight of the food weighing bowl, wherein, during weighing, the food weighing bowl is located above the food processing container,
    wherein the weighing bowl is configured to cover the container during the processing of the foodstuff.

2. The device according to claim 1, wherein the at least one weighing sensor is comprised in a top rim of the food processing container.

3. The device according to claim 1, wherein the at least one weighing sensor is comprised in a top rim of the housing.

4. The device according to claim 1, further comprising a weighing bowl support structure, wherein the weighing bowl support structure is arranged to support the weighing bowl during weighing, and said weighing support structure is further arranged to transfer the weight of the weighing bowl to the at least one weighing sensor.

5. The device according to claim 1, wherein the at least one weighing sensor is located on a bottom side of the weighing bowl.

6. The device according to claim 1, wherein the weighing bowl is removably attached to the food processor.

7. The device according to claim 1, wherein the weighing device comprises three weighing sensors.

8. The device according to claim 1, wherein the weighing bowl comprises a fall-through mechanism to allow the foodstuff to fall into the food processing container after weighing.

9. The device according claim 1, further comprising heating means for heating the foodstuff during preparation.

10. The device according to claim 1, wherein the weighing bowl comprises two substantially parallel plates having a plurality of holes, said plates forming the bowl bottom, said two plates being rotatable with respect to each other around an axis of rotation substantially located in the center of the weighing bowl, said axis of rotation being perpendicular to said plates, wherein the two plates are rotatable into a closed position wherein the holes of the first plate are covered by the second plate and an open position wherein the holes of the first plate and the holes of the second plate are coaxial.

11. The device according to claim 8, wherein the fall-through mechanism comprises a moveable element which is moveable between a closed position for weighing the foodtsuff and an open position for allowing the foodtsuff to fall into the container.

12. The device according to claim 8, wherein the fall-through mechanism comprises a central aperture, wherein the central aperture is adjustable between a closed position for weighing the foodtsuff and an open position for allowing the foodtsuff to fall into the container.

13. A device according to claim 8, wherein the fall-through mechanism comprises a first plate and a second plate, wherein the first and second plates are substantially parallel to each other, wherein the first plate and the second plate each cover a section of the weighing bowl bottom, wherein the first plate and the second plate are rotatable with respect to each other around an axis of rotation substantially located in a center of the weighing bowl, said axis of rotation being perpendicular to said first and second plates, and wherein the first and second plates are rotatable into a closed position wherein the first and second plates cover an entire section of the weighing bowl bottom, and an open position wherein the first and second plates cover a partial section of the weighing bowl bottom.

14. A device for processing foodstuff comprising:
a housing;
a food processing container for holding foodstuff during processing, wherein during use the food processing container is supported by said housing;
a user interface for exchanging information, during use, between a user and the device;
a food weighing bowl for weighing foodstuff before said foodstuff is being entered into the food processing container; and
at least one weighing sensor for sensing the weight of the food weighing bowl, wherein, during weighing, the food weighing bowl is located above the food processing container,
wherein the at least one weighing sensor is located in one of a top rim of the food processing container and a top rim of the housing.

15. The device of claim 14, wherein the weighing bowl is configured to cover the container during the processing of the foodstuff.

16. The device of claim 14, wherein the weighing bowl comprises a fall-through mechanism to allow the foodstuff to fall into the food processing container after weighing.

17. A device for processing foodstuff comprising:
a housing;
a food processing container for holding foodstuff during processing, wherein during use the food processing container is supported by said housing;
a user interface for exchanging information, during use, between a user and the device;
a food weighing bowl for weighing foodstuff before said foodstuff is being entered into the food processing container; and
at least one weighing sensor for sensing the weight of the food weighing bowl, wherein, during weighing, the food weighing bowl is located above the food processing container,
wherein the weighing bowl comprises a fall-through mechanism to allow the foodstuff to fall into the food processing container after weighing, and
wherein the fall-through mechanism comprises a central aperture, the central aperture being central to the weighing bowl.

18. The device of claim 17, wherein the weighing bowl is configured to cover the container during the processing of the foodstuff.

19. The device of claim 17, wherein the at least one weighing sensor is located in one of a top rim of the food processing container and a top rim of the housing.

20. The device according claim 1, further comprising a heater configured to heat the foodstuff during preparation.

* * * * *